US006441107B1

(12) United States Patent
Muruganandam et al.

(10) Patent No.: US 6,441,107 B1
(45) Date of Patent: Aug. 27, 2002

(54) MOLECULAR WEIGHT CONTROL OF GAS PHASE POLYMERIZED POLYBUTADIENE WHEN USING A RARE EARTH CATALYST

(75) Inventors: Natarajan Muruganandam, Belle Meade; Kevin Joseph Cann, Rocky Hill; Maria Angelica Apecetche, Piscataway; John Henry Moorhouse, Kendall Park, all of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/215,981

(22) Filed: Dec. 18, 1998

(51) Int. Cl.[7] .............................. C08F 2/34; C08F 136/00
(52) U.S. Cl. ........................ 526/60; 526/153; 526/164; 526/34.04; 526/901; 524/856
(58) Field of Search ................................. 526/164, 172, 526/340.4, 901, 59, 60, 153; 524/856

(56) References Cited

U.S. PATENT DOCUMENTS 4,429,089 A * 1/1984 Pedretti et al. ......... 526/164 X
4,994,534 A 2/1991 Rhee et al. .................... 526/88
5,453,471 A 9/1995 Bernier et al. ................. 526/68
5,908,904 A * 6/1999 Sylvester et al. ....... 526/129 X

FOREIGN PATENT DOCUMENTS

WO       WO 96/04323       2/1996

OTHER PUBLICATIONS

Zhiliang, et al, "Synthesis and Properties of Rare Earth Polybutadiene With Narrow Molecular Weight Distribution," Synthesized Rubber Industry, 1990, 14(1): 11–14.*

Kinetics and Molecular Weights Distribution Study of Neodymium–Catalyzed Polymerization of 1,3–Butadiene; J.B. Nickaf et al.; J. of Poly. Sci.: Pt. A:Polym. Chem., 33, 1125–1132. (1995).

* cited by examiner

Primary Examiner—Fred Teskin

(57) ABSTRACT

A process for controlling the molecular weight (Mw) and molecular weight distribution (MWD) of polybutadiene polymerized in an otherwise gas phase process using a rare earth catalyst is provided.

12 Claims, No Drawings

MOLECULAR WEIGHT CONTROL OF GAS PHASE POLYMERIZED POLYBUTADIENE WHEN USING A RARE EARTH CATALYST

FIELD OF THE INVENTION

The present invention relates to the gas phase production of polybutadiene. More particularly, the invention relates to a method for controlling the molecular weight and/or molecular weight distribution of high cis-1,4-polybutadiene as it polymerized from 1,3-butadiene in the presence of a rare earth catalyst in a gas phase process.

BACKGROUND OF THE INVENTION

Commercially, polybutadiene (BR), which is highly amorphous, has long been produced using solution, slurry/bulk suspension, or emulsion processes in which the reaction medium is liquid, not gaseous. There is little or no gas present in these processes such that a gas is never the fluidizing medium or mechanism. Some of these processes are batch or plug flow in which all the catalyst is in contact with monomer for a uniform time and the liquid monomor(s) are consumed without being replenished. Hence, in these processes polymer molecular weight is correlated and plotted as a function of percent conversion of the monomer. Monomer conversions of 70–90% per pass through the reactor system are typically sought in order to achieve the desired molecular weight of the polymer. Others of these processes are operated in a continuous manner, but not as a single continuous stirred tank reactor, rather as a series of such reactors, for example four to nine. Fresh monomer is only added to the first reactor in the series and monomer is allowed to be consumed without replenishment in the subsequent reactors. It is well known in the art that a series of continuous stirred tank reactors operated this way approximates a plug flow reactor in its kinetics and so molecular weight is also correlated with monomer conversion for these multi-reactor processes and high monomer conversions per pass are again sought. Finally, some processes use two different types of reactors in series—an initial continuous stirred tank reactor followed by a plug flow reactor in which high monomer conversions and thus high molecular weight can be achieved. See, for example, U.S. Pat. No. 4,710,553. A common feature in all of these processes is that the monomer concentration around the catalyst is decreasing substantially as the catalyst travels through the continuous process toward the polymer exit or as residence time increases in a batch reactor. Another common feature is that catalyst residence time in the exiting product is uniform for batch and plug flow reactors and somewhat uniform for a series of continuous stirred reactors.

All of these commercial BR processes are energy and labor intensive, multi-step processes and involve liquids of viscosities that increase greatly during the course of the polymerization. A major concern in all these processes is that the mixture remain sufficiently low in viscosity so that it can be processed in the equipment such as mechanically stirred vessels and/or extruders. Because of the generally high viscosity involved in such conventional liquid BR processes, the addition of solids in these processes is generally avoided, as their presence makes processing all the more difficult since they increase the viscosity of the mix. In addition, in these processes, when molecular weight regulators are employed to control the molecular weight of the polymer as it is being produced, chemical compounds that are liquid or solid are generally chosen rather than hydrogen gas. See, for example, AU 595,291 and U.S. Pat. Nos. 5,637,661 and 4,663,405. The final product of these processes is a solid mass or bale. The solid mass or bale is not granular or powdery or even small strips without additional pulverization, grinding or chopping steps that are undertaken by the end-user.

Alpha olefin homopolymers and copolymers (e.g., polyethylene, polypropylene, ethylene-hexene polymers, and the like) have long been produced using gas phase processes. They are highly crystalline as compared to other polymers, such as polybutadiene (BR), ethylene propylene copolymer (EPR) and ethylene propylene diene terpolymer (EPDM), which have only more recently been produced in gas phase processes. Typically, alpha olefin homopolymers and copolymers are produced in gas phase processes at higher temperatures relative to polybutadiene, EPR and EPDM. In the gas phase production of alpha olefin homopolymers and copolymers and of BR, EPR and EPDM, the gaseous monomer(s) and catalyst are fed continuously. This means the monomers are continually replenished. Monomer conversion per pass through a fluidized bed is typically only about 1–4% of the monomer concentration. This low conversion per pass, continual monomer replenishment, and backmixed characteristic of the gas phase process result in monomer concentration around the catalyst particle being quite constant throughout the polymerization. Nevertheless, total monomer efficiency in a gas phase polymerization is typically 95% or higher by means of returning the unreacted gas mixture to the reacting bed. The catalyst is removed in and with the product, so catalyst present in the reactor has a wide distribution of residence times. For single reactor systems, such as those commonly employed in gas phase polymerization processes, such residence times completely cover the range from catalyst that is only present in the reactor for seconds before it exited with product to catalyst that has been present in the reactor for many, many hours before exiting. For alpha olefin homopolymers and copolymers the fluidizing gas medium is gaseous unreacted monomer plus some inert gas, such as nitrogen. Hydrogen is typically employed as a chain transfer agent rather than a liquid or solid chemical compound since these compounds may not distribute as well and can interfere with end-use properties and/or fluidization. Historically, in these polymerizations, liquid in significant quantities was shunned prior to condensing mode operation. In condensing mode, liquid which is immediately vaporized is used to cool the exothermic polymerization, thereby increasing production. Because of the crystalline nature of the forming polymers, the feeding of liquid monomers, which are not vaporized and cannot be adsorbed or absorbed in the crystalline polymer, was thought to cause the collapse of the fluidized bed. Solids, other than that employed in a support for a catalyst, were also avoided since they can adversely affect properties of end-use products (e.g., films). The final polymer is dry, granular and/or powdery upon exiting the reactor.

More recently, it has been discovered that BR, as well as other similar amorphous polymers such as EPR, EPDM, polyisoprene and the like, can be produced in gas phase processes such as those taught in U.S. Pat. Nos. 4,994,534 and 5,453,471; and WO 96/04323. WO 96/04323 teaches the gas phase production of BR using a rare earth catalyst (e.g., neodymium) in which product in the reactor is not "dry" like crystalline alpha olefin polymers. Significant amounts of liquid monomer are typically present in gas phase BR processes. However, after purging to remove monomer the product is in granular, free-flowing form, thereby eliminating end-user grinding, pulverization and chopping. Hence, these gas phase processes for amorphous polymers differ significantly from both conventional liquid BR processes and from gas phase alpha olefin polymerization processes.

In these gas phase processes such as for BR, in order to produce polymers above the softening or sticking temperature, most of these gas phase processes prefer to employ a solid inert particulate material which serves to prevent agglomeration of the bed of forming polymer. Because this fluidization aid reacts with the cocatalyst, a total amount of cocatalyst must be fed that is higher than that employed in crystalline alpha olefin polymerizations, where no fluidization aid is used, in order to have the desired amount of cocatalyst available to react with the catalyst and monomer. This balance in cocatalyst level between that needed to react with the fluidization aid and that needed for proper functioning of the polymerization catalyst is difficult to maintain, and is not an issue for liquid BR processes or gas phase alpha olefin polymerizations, yet cocatalyst level can profoundly impact catalyst performance and polymer properties including molecular weight. Furthermore, in liquid BR processes the catalyst is surrounded by liquid phase butadiene monomer. Even in solution BR processes where the monomer is somewhat diluted by solvent, by virtue of being liquid the monomer present is much more concentrated than the majority of the butadiene present as gas in a gas phase BR reactor. By contrast with alpha olefin polymerizations, the gaseous fluidizing medium for BR polymerizations is typically comprised of more nitrogen due to the lower dewpoint of butadiene monomer versus the typical alpha olefin monomer mixtures used in gas phase reactors. When a rare earth catalyst is employed in a gas phase BR reactor, the polymer formed tends to be high in molecular weight and broad in molecular weight distribution rather than of the moderate molecular weight and moderate molecular weight distribution desired in commercial applications. Hydrogen is not employed to regulate molecular weight because it is ineffective with rare earth catalysts. Catalysts employed in gas phase BR processes can be, for example, solids on a support such as silica, or slurries in liquids such as oil, or solutions in a small amount of solvent, but generally supported catalysts are used. In liquid BR processes unsupported slurry or solution catalysts are employed and catalysts that completely dissolve are preferred since they are often claimed to give superior performance. Supporting a catalyst can produce substantial changes in performance, particularly if reactions with the support are involved.

Therefore, there are very significant differences between a gas phase BR process and other BR processes, for example bulk and solution processes.

A persistent problem in BR polymerizations is the difficulty of achieving a polymer with molecular weight and molecular weight distribution in the desired range and having the means to reliably control the molecular weight and molecular weight distribution in that region so that reproducible product may be routinely made and commercial success made possible. This difficulty is described at length in U.S. Pat. No. 4,710,553 for bulk or mass polymerizations in the absence or near absence of solvent using a variety of catalysts including metal compounds such as titanium, cobalt, nickel, uranium and rare earth metals. Among the factors leading to a lack of success are the high concentration of monomer in bulk reactors which gives rise to "transfer" reactions that lead to obtaining low molecular weight polymers, rarely usable in applications. Even with rare earth catalyst systems, it is noted that BR is generally obtained from bulk processes whose Mooney viscosity value (a measure of molecular weight) is not constant due to insufficient homogenization of the system composed of catalyst, monomer and polymer. This occurs in part due to the technical, Theological and heat exchange difficulties encountered in the treatment of highly viscous masses. To overcome this U.S. Pat. No. 4,710,553 describes a two-step batch process or alternatively a process with a stirred reactor and a plug flow reactor, possibly an extruder, in series. In either arrangement the first reaction step occurs below 30° C. where the polymer dissolves in the monomer and homogeneous conditions can be maintained as long as conversion is limited to 20% so that viscosity effects are tolerable. The second reaction step occurs above 30° C. where the polymer separates out as a solid phase and allows polymerization to continue to high conversions (60–70%) without having viscosity limitations hinder homogenization in the liquid phase. It can be readily seen that this type of invention that is found useful in bulk polymerization processes is not applicable to the matter of molecular weight control in gas phase BR reactions which are conducted in the presence of amounts of non-viscous liquid that do not hinder homogenization of the mixture of catalyst, reactant and polymer.

In another variation described in U.S. Pat. No. 4,736,001, better control of molecular weight of BR made with rare earth catalyst is said to be achieved by improving homogenization in the viscous liquid mixture in a bulk polymerization reactor by addition of typically 1–10% of solid bodies, such as high molecular weight polyethylene powder, carbon black, etc. This method of improving molecular weight control by better homogenization in a viscous liquid mixture is not pertinent to gas phase BR polymerization reactors where such viscous liquid mixtures are neither present nor a problem.

The difficulty of adequately controlling the molecular weight of BR polymers made with rare earth catalysts in particular is described in U.S. Pat. No. 4,663,405. Rare earth catalysts are normally considered to be pseudo-living since the polymers made using them increase in molecular weight with increasing monomer conversion at a given catalyst concentration. As a result any change in conversion or catalyst residence time typically affects the molecular weight of the final polymer. Since residence times and conversions are difficult to control precisely in continuous polymerization systems, polymers having varying molecular weights are produced and molecular weight control is often difficult. Traditional molecular weight modifiers such as hydrogen gas are ineffective with rare earth catalysts. In U.S. Pat. No. 4,663,405 vinyl halides are claimed as molecular weight control agents for polymerizations using rare earth catalyst systems. However, vinyl halide concentrations of up to 1% had to be used in solution polymerizations to accomplish minor lowering of the molecular weight, that is from 4.64 dilute solution viscosity (DSV) to 3.68 DSV. Since significant quantities are needed to be effective and vinyl halides are chemicals with very high toxicity and are tightly regulated, we have sought alternative and more effective means of controlling polymer molecular weight in gas phase reactors.

U.S. Pat. No. 4,461,883 gives further evidence of the difficulty of adequately controlling polymer molecular weight when using rare earth catalysts and provides yet another technique for doing so in liquid BR processes. The more preferred version of this method involves use of a mixture of cocatalysts combined with use of a reactor solvent that is 1 to 50% by weight of aromatic hydrocarbon such as toluene. It is specifically stated that when the aromatic solvent is less than 0.3% by weight, the molecular weight of the polymer cannot be sufficiently regulated. A technique like this that involves large quantities of solvents of which at least a portion is required to be aromatic is obviously difficult to apply to a gas phase process that operates in the substantial absence of solvent.

In summary, the gas phase production of polybutadiene is different from both alpha olefin gas phase polymerizations and liquid solution or bulk BR polymerizations. Compared with liquid BR processes, which are batch, plug flow, or multiple continuous reactors in series that approximate plug flow and all have a uniform or nearly uniform residence time on the order of hours, a gas phase BR process involves a single, backmixed continuous reactor with a very broad distribution of residence times ranging from seconds to many hours. In addition, the gas phase reactor has essentially constant monomer concentration with very little conversion (1–4%) per pass through the bed compared with a continuously depleting monomer concentration with 70–90% monomer conversion per pass through the reactor system in liquid processes. This means that in a liquid BR process monomer concentrations at the end are typically 70–90% lower than they were at the beginning of the polymerization. Also of importance is that monomer concentrations are very different in gas versus liquid processes due to the different phases involved. In gas phase BR processes effective cocatalyst to catalyst ratios are different and more difficult to control due to the interaction with fluidization aid. Viscosity impact on liquid mixing is a major concern in liquid BR processes and is commonly stated to interfere with molecular weight control, yet is of no consequence in a gas phase BR process. Different molecular weight control agents are employed in gas and liquid processes by virtue of the process differences. Due to these many substantial differences in variables that commonly impact catalyst performance and polymer molecular weight, it is not expected that molecular weight control techniques that work in liquid BR processes would have applicability in gas phase BR processes. Finally, we have shown how prior art is not applicable to gas phase BR processes.

Nevertheless, in general, in the gas phase production of BR, it is difficult to produce a BR polymer of a desired molecular weight (MW) and/or molecular weight distribution (MWD). There is an on-going need to discover means to resolve these deficiencies in the gas phase production of polybutadiene.

SUMMARY OF THE INVENTION

Accordingly, there is provided a method of controlling the molecular weight, molecular weight distribution or both of high cis-1,4-polybutadiene that is produced in a gas phase process from 1,3-butadiene in the presence of a rare earth metal containing catalyst, which method comprises adjusting at least one of:

(a) the temperature of the polymerization;

(b) the butadiene partial pressure;

(c) the concentration of cocatalyst in the product in the reactor or alternatively, the ratio of the aluminum metal of the cocatalyst to the rare earth metal of the catalyst;

(d) selection of the cocatalyst and (e) the residence time of the rare earth catalyst.

DETAILED DESCRIPTION OF THE INVENTION

The present invention provides a method for controlling the molecular weight, molecular weight distribution, or both of polybutadiene that is produced in a gas phase process using butadiene monomer and a rare earth metal catalyst. The method comprises adjusting or manipulating at least one of the following:

(a) the temperature of the polymerization;

(b) the butadiene partial pressure;

(c) the concentration of cocatalyst in the product in the reactor or alternatively, the ratio of the aluminum metal of the cocatalyst to the rare earth metal of the catalyst;

(d) selection of cocatalyst; and (e) the residence time of the rare earth catalyst while the polymerization is taking place.

Temperature of the polymerization. It was found that as the reaction temperature in a gas phase polymerization of polybutadiene increases the molecular weight of the polybutadiene being produced decreases when other conditions or factors such as (b) through (e) above are kept constant. Conversely, when the reaction temperature is lowered, molecular weight increases. When only the molecular weight of the final polymer needs to be controlled, the polymerization temperature is adjusted upward or downward by manual or computerized means known to those skilled in the fluidized gas phase art. The temperature of the polymerization is dependent upon the degree of cooling of the cycle or recycle gas in the reactor. When the reaction temperature is increased, the molecular weight distribution broadens. Conversely, when the reaction temperature is decreased, molecular weight distribution narrows. When using the reaction temperature to control primarily molecular weight, control of molecular weight distribution can come from manipulation of one or more of the other above-enumerated variables. The preferred variables manipulated in conjunction with reaction temperature are the selection of cocatalyst and the residence time of the rare earth metal catalyst in the reactor.

Butadiene partial pressure. It was observed that as the butadiene partial pressure increases the molecular weight of the final polybutadiene produced increases. And when the butadiene partial pressure decreases, the molecular weight also decreases. When other conditions were constant, the dependency of molecular weight with partial pressure is in accordance with the following relationship:

$$MW = a + b \quad (p)$$

where a is a constant, b is a positive constant, and p is butadiene partial pressure. The constants a and b remain constant only when other conditions remain constant. The value of these constants will also change with type of catalyst and choice of cocatalyst employed. Molecular weight distribution is narrowed with increasing butadiene partial pressure. For some rare earth metal catalysts this effect ceases above a certain partial pressure. This provides the means to independently adjust molecular weight without affecting molecular weight distribution in this range of partial pressure. A preferred combination is to use one or more of selection of cocatalyst, reaction temperature or residence time of the rare earth metal in the polymerization vessel to adjust molecular weight distribution and use butadiene partial pressure to adjust molecular weight. Typically, the partial pressure of butadiene is manipulated upward or downward manually or by means of computerized programs and equipment known to those skilled in gas phase polymerization.

Cocatalyst concentration. The molecular weight of the polybutadiene produced can be controlled by varying the cocatalyst concentration in the polymer in the reactor. Under many circumstances varying the ratio of cocatalyst (or aluminum metal) to catalyst (or rare earth metal of the precursor) amounts to another means of varying the cocatalyst concentration. There is an inverse relationship between the cocatalyst concentration and molecular weight. That is, as the catalyst concentration (or Al to rare earth metal ratio) increases the molecular weight of the polymer decreases. Conversely, when the cocatalyst concentration decreases, the molecular weight of the polymer increases. One means of adjusting cocatalyst concentration during polymerization is by maintaining a constant production rate while increasing or decreasing the flow or feed of alkyl aluminum (cocatalyst) to the polymerization. However, for some catalysts there is a threshold of cocatalyst concentration beyond which molecular weight does not decrease with increase of concentration and, thus, a plateau is reached. Molecular weight distribution (Mw/Mn) increases as cocatalyst concentration increases. Conversely, molecular weight distribution decreases as cocatalyst concentration decreases. Since several variables significantly affect molecular weight distribution, its control can best be accomplished by selection of cocatalyst, reaction temperature and residence time of the catalyst in the reactor in conjunction with cocatalyst concentration.

Selection of cocatalyst. The choice of cocatalyst is a strong variable in the determination of molecular weight and molecular weight distribution (MWD) of polybutadiene made with a neodymium catalyst. For example, an alkyl aluminum cocatalyst having one or more alkyl groups replaced with a hydrogen, such as diisobutylaluminum hydride (DIBAH), in conjunction with a neodymium catalyst produces polymers with lower molecular weight and broad MWD. In contrast, trialkyl aluminum cocatalysts such as triisobutylaluminum (TIBA) resulted in formation of a high molecular weight polymer having a narrow MWD. By narrow MWD is meant a polymer having an Mw/Mn below 4. By broad MWD is meant a polymer having an Mw/Mn above 6. An intermediate MWD (Mw/Mn) polymer is one ranging from 4 to 6 inclusive and is generally achieved by employing a mixture of two or more cocatalysts (e.g., one producing narrow MWD and one producing broad MWD). When two or more cocatalysts are employed, adjustment of the proportions of the cocatalysts is a further means for controlling molecular weight and MWD. DIBAH is preferred for producing a polybutadiene having a broad molecular weight distribution. TIBA is preferred for producing a polybutadiene having a narrow molecular weight distribution. TIBA and mixtures of TIBA and DIBAH are preferred for producing polybutadiene having an intermediate molecular weight distribution. During polymerization, there can be combined or separate feeds for each cocatalyst employed. When a plurality of cocatalysts are employed, the individual cocatalysts are fed using various (e.g., alternating or simultaneous) feed sequences known to those skilled in gas fluidization art.

Residence time. The molecular weight of the polymer of butadiene is greatly influenced by the length of time the catalyst particle resides in the reactor. In the gas phase production of polybutadiene, molecular weight increases with an increase in average catalyst residence time. Analogously, molecular weight decreases with a decrease in average catalyst residence time. Longer residence time results in a polymer having a narrow MWD; shorter residence time produces a polymer having a broader MWD. The polymer exiting a reactor is comprised of many individual particles containing both polymer and catalyst. Depending upon reactor type, catalyst feed practices, and other operation practices these catalyst particles will have uniform or widely varying residence times. The average residence time of all particles in the exit stream from a continuous backmixed gas-phase reactor is manipulated by means such as regulating the catalyst feed and/or by removing product more frequently or less frequently both of which affect the production rate. Adjustment of the bed weight is another means of manipulating average catalyst residence time, but is less preferred for use with an existing reactor. Other means include, for example, changing catalyst productivity or fluidized bulk density by means such as varying butadiene partial pressure or reactor temperature.

It is understood that molecular weight and molecular weight distribution are affected by the type of reactor used in the gas phase polymerization. Each of the various reactor types such as batch, semi-batch and continuous reactors have characteristic residence time distributions associated with them and so affect molecular weight and distribution of the produced polymer accordingly. The specific way in which a semibatch reactor is operated, for example catalyst feed and other operation practices, will make its residence time distribution more like that of a batch reactor or that of a continuous reactor. Control techniques and process conditions that work for one reactor type may not work for the other in terms of producing the desired molecular weight and molecular weight distribution for the produced polymer of butadiene. This specification describes a means invented to control the molecular weight and molecular weight distribution of a single, continuous, backmixed or approximately backmixed gas phase reactor or a semibatch gas phase reactor operated in a manner that approximates a single, continuous, backmixed or approximately backmixed gas phase reactor.

Rare Earth Catalyst. The catalyst employed in the method is a rare earth metal catalyst. It is not limited to any particular class of rare earth metal catalyst. Rare earth metal catalysts that have been previously employed in slurry, solution, or bulk polymerizations of higher boiling or readily condensable monomers (e.g., butadiene and isoprene) can be utilized in the invention.

The rare earth metal catalyst employed in the gas phase process of this invention can have a rare earth metal component, a cocatalyst, and optionally a promoter. Preferably, a promoter is not employed in the catalyst composition used in the inventive process.

Any compound, organic or inorganic, of a metal chosen from those of Group IIIB of the Periodic Table of the Elements in which the metal has an atomic number of 57 to 103 inclusive can be employed. Examples of such metals are cerium, lanthanum, praseodymium, gadolinium, and neodymium. Preferred among these metals is neodymium. Compounds in which these metals can be employed include, for example, carboxylates, alcoholates, acetylacetonates, halides (including ether and alcohol complexes of a rare earth metal trihalide), and allyl derivatives. Neodymium compounds are the most preferred. Illustrative neodymium compounds can include neodymium trichloride, neodymium trichloride complexes formed with tetrahydrofuran (e.g., $NdCl_3(THF)_2$) and ethanol (e.g., $NdCl_3(EtOH)_3$), neodymium 2,2-diethylhexanoate, neodymium 2-ethylhexoate, neodymium 2-ethyloctoate, neodymium 2,2-diethylheptanonate, allyl neodymium dichloride, bis-allyl neodymium chloride, and tris-allyl neodymium. Neodymium neodecanoate, octanoate, and versatate give particularly good results.

The catalyst modifiers and cocatalysts consist of aluminum alkyl halides, trialkyl aluminum compounds and alkyl aluminum hydride compounds such as the following:

Alkylaluminum halides can be a compound having the formula $AlR_{(3-a)}X_a$ wherein each R is independently alkyl having 1 to 14 carbon atoms; each X is independently chlorine, bromine, or iodine; and a is 1 or 2 or a mixture of compounds having the formulas $AlR_{(3-a)}X_a$ and $AlR_3$ wherein R, X, and a are the same as above.

Examples of halogen containing modifiers and cocatalysts are diethylaluminum chloride; ethylaluminum sesquichloride; di-n-butylaluminum chloride; diisobutylaluminum chloride; methylaluminum sesquichloride; isobutylaluminum sesquichloride; dimethylaluminum chloride; di-n-propylaluminum chloride; methylaluminum dichloride; and isobutylaluminum dichloride. Diethylaluminum chloride (DEAC), ethylaluminum sesquichloride (EASC), and diisobutylaluminum chloride (DIBAC) are most preferred.

The trialkylaluminums can be a hydrocarbyl as follows: triisobutylaluminum, trihexylaluminum, di-isobutylhexylaluminum, isobutyl dihexyl-aluminum, trimethylaluminum, triethylaluminum (TEAL), tripropylaluminum, triisopropylaluminum, tri-n-butylaluminum, trioctylaluminum, tridecylaluminum, and tridodecylaluminum (including partially hydrolyzed derivatives of these aluminum compounds also known as aluminoxanes).

Preferred cocatalysts that can be employed with rare earth metal compounds include triethylaluminum (TEAL), triisobutylaluminum (TIBA), trihexylaluminum (THAL), methylaluminoxane (MAO), modified methylaluminoxane (MMAO), trimethylaluminum (TMA), a dialkyl aluminum hydride or a mixture of a dialkyl aluminum hydride and a trialkyl aluminum.

When MAO or MMAO is employed as the cocatalyst, it may be one of the following: (a) branched or cyclic oligomeric poly(hydrocarbylaluminum oxide)s which contain repeating units of the general formula —(Al(R''')O)—, where R''' is hydrogen, an alkyl radical containing from 1 to about 12 carbon atoms, or an aryl radical such as a substituted or unsubstituted phenyl or naphthyl group; (b) ionic salts of the general formula $[A^+][BR^*_4{}^-]$, where $A^+$ is a cationic Lewis or Bronsted acid capable of abstracting an alkyl, halogen, or hydrogen from the metal component of the catalyst, B is boron, and R* is a substituted aromatic hydrocarbon, preferably a perfluorophenyl radical; and (c) boron alkyls of the general formula $BR^*_3$, where R* is as defined above.

Aluminoxanes are well known in the art and comprise oligomeric linear alkyl aluminoxanes represented by the formula:

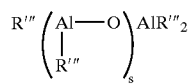

and oligomeric cyclic alkyl aluminoxanes of the formula:

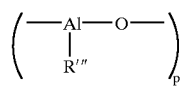

wherein s is 1 to 40, preferably 10 to 20; p is 3 to 40, preferably 3 to 20; and R''' is an alkyl group containing 1 to 12 carbon atoms, preferably methyl or an aryl radical such as a substituted or unsubstituted phenyl or naphthyl radical. Modified methylaluminoxane is formed by substituting 20–80 wt % of the methyl groups with a $C_2$ to $C_{12}$ group, preferably with isobutyl groups, using techniques known to those skilled in the art.

Promoters that can be used with rare earth metal compounds include Lewis acids such as $BCl_3$, $AlCl_3$, ethylaluminum dichloride, ethylaluminum sesquichloride, diethylaluminum chloride, and other alkyl radical derivatives of these compounds.

Organohalide derivatives of the formula

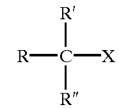

in which X is Cl or Br, R is H, alkyl, aryl, alkylaryl, chloro or bromo alkyl, alkoxy or epoxy; R' is alkyl, aryl, H, Cl or Br; R" is alkyl, aryl, chloro or bromo alkyl, chloro or bromo aryl, vinyl, Cl or Br; or R'+R" is oxygen, or saturated or unsaturated cycloalkyl. If R=R'=H, then R" is only of aromatic nature. The alkyl radicals can be either saturated or unsaturated, linear or branched, and contain from 1 to 18 carbon atoms.

Typical examples of organohalide derivatives which can be used as catalytic components of the present invention are benzoyl, propionyl, benzyl, benzylidene or tertiary butyl chlorides or bromides, methyl chloroformate or bromoformate, chlorodiphenylmethane or chlorotriphenylmethane, and the like.

The catalyst can be prepared by mixing the support material, the metal component, cocatalyst, and optional promoter in any order in an inert solvent or diluent. In general the metal component can be impregnated on a support by well known means such as by dissolving the metal compound in a solvent or diluent such as a hydrocarbon or ether (including aliphatic, cycloaliphatic or aromatic compounds such as pentane, isopentane, hexane, cyclohexane, benzene, toluene, and tetrahydrofuran) in the presence of the support material and then removing the solvent or diluent by evaporation such as under reduced pressure. Alternatively, the rare earth metal component can be dissolved in a solvent or diluent such as a hydrocarbon or tetrahydrofuran and spray dried to generate a well-shaped catalyst precursor having little or no silica or other inorganic solids content, if desired.

A preferred method for making the catalyst of this invention involves impregnating a silica support, a carbon black support, or a mixed support of the two with a rare earth metal containing compound. The amount of metal impregnated on the support can range between 0.1 and 1.0 millimole/g catalyst. An organic alkyl aluminum compound may be added prior, during or subsequent to the impregnation step, either in a hydrocarbon or oxygenated solvent such as THF. The catalyst may be isolated as a dry solid or used as a slurry in a diluent. The catalyst may also be prepared without a support by simple contact of the metal with the alkyl aluminum compound to form a solution or slurry which is fed directly to the reactor. The Al to metal ratio in the catalyst preparation step may vary between 0.5 to 5.0. The polymerization metal may be used without aluminum treatment when an organohalide promoter or aluminum alkyl halide is also fed to the reactor with the cocatalyst. When MAO is used as the cocatalyst no halide source is required.

A preferred procedure for making the rare earth catalyst of the invention comprises the sequential steps of (A) treating a silica support, carbon black support, or mixture of the two support materials with a mono- or di-ethyl aluminum chloride or a mixture of the two chlorides (e.g. EASC) in a hydrocarbon solvent thereby forming a slurry (the solvent may be optionally removed at this point by evaporation leaving a dry aluminum alkyl treated silica support which is then used in step B after the addition of hydrocarbon diluent); (B) adding the rare earth compound (e.g., a neodymium compound); and (C) removing the hydrocarbon solvent or diluent. Catalyst/cocatalyst combinations which are preferred in the process of this invention are a neodymium neodecanoate, neodymium octoate, or neodymium versatate as the metal component, and an organic alkyl aluminum compound such as diethyl aluminum chloride or ethylaluminum sesquichloride to form the catalyst in a diluent such as n-hexane or cyclohexane. Another preferred procedure utilizes a neodymium carboxylate or alcoholate such as neodymium neodecanoate, neodymium octoate, or neodymium versatate as the metal component which is impregnated on silica by dissolving the neodymium compound in THF, adding silica, followed by solvent removal. The dry solid is added to a hydrocarbon (e.g. hexane) solution containing an alkylaluminum chloride with subsequent removal of the hydrocarbon solvent. When using these catalysts, also fed to the reactor is a cocatalyst selected from the group consisting of diisobutyl aluminum hydride (DIBAH), triisobutylaluminum (TIBA), or a mixture of diisobutyl aluminum hydride and triisobutylaluminum. These catalysts are preferred because they have little or no induction period and remain catalytically active for a long period of time. The catalyst I above can be fed directly to the reactor. Still another catalyst can be prepared by forming a reaction mixture by (i) contacting a neodymium compound selected from the group consisting of a neodymium carboxylate, a neodymium alcoholate and a neodymium acetylacetonate with a mono-ethyl aluminum dichloride, a di-ethyl aluminum chloride or a mixture of the mono- and di-ethyl aluminum chloride (ii) depositing the mixture on a silica support in the presence of a solvent to form a slurry and (iii) removing said solvent; and adding a cocatalyst selected from the group consisting of (i) dialkyl aluminum hydride, (ii) a trialkyl aluminum, (iii) a mixture of a dialkyl aluminum hydride and a trialkyl aluminum, (iv) methylaluminoxane, (v) modified methylaluminoxane, (vi) and mixtures thereof.

Polymerization Process and Conditions. The invention can be used for the gas phase polymerization of polybutadiene. Gas phase processes employable in the present invention can include so-called "conventional" gas phase processes, "condensed-mode," and, most recent, "liquid-mode" processes. In these processes, it is desirable to include a scavenger in the reactor to remove adventitious poisons such as water or oxygen before they can lower catalyst activity.

Conventional fluidized processes are disclosed, for example, in U.S. Pat. Nos. 3,922,322; 4,035,560; 4,994,534, and 5,317,036.

Condensed mode polymerizations, including induced condensed mode, are taught, for example, in U.S. Pat. Nos. 4,543,399; 4,588,790; 4,994,534; 5,317,036; 5,352,749; and 5,462,999.

Liquid mode or liquid monomer polymerization mode is described in U.S. Pat. No. 5,453,471; and WO 96/04323 (PCT/US95/09826). For diolefin (e.g., butadiene) polymerization of the invention, it is preferable to use liquid mode and to employ an inert particulate material, a so-called fluidization aid or flow aid.

Inert particulate materials are described, for example, in U.S. Pat. No. 4,994,534 and include carbon black, silica, clay, talc, and mixtures thereof. Organic polymeric materials (e.g., polymers and copolymers of an alpha olefin and polystyrene, in granular or powder form) can also be employed as fluidization aids. Of these, carbon black, silica, and mixtures of them are preferred. When employed as fluidization aids, these inert particulate materials (carbon black, silica, clay, or talc) are used in amounts ranging from about 0.3 to about 80% by weight, preferably about 5 to 60%, most preferably 10 to 45%, based on the weight of the polymer produced. Organic polymeric materials are employed in amounts ranging from 0.3 to 50%, preferably 0.3 to 10% by weight based upon the weight of the final polymer produced.

The fluidization aid can be introduced into the reactor at or near the top of the reactor, at the bottom of the reactor, or to the recycle line directed into the bottom of the reactor. Preferably, the fluidization aid is introduced at or near the top of the reactor or above the fluidized bed. It is preferred to treat the fluidization aid prior to entry into the reactor to remove traces of moisture and oxygen. The fluidization aid can be added separately or combined with all or a portion of the butadiene or with a soluble unsupported catalyst.

Preferably, the fluidization aid is added separately. The use of inert particulate materials as fluidization aids in polymer polymerization produces a polymer having a core-shell configuration such as that disclosed in U.S. Pat. No. 5,304,588. The polybutadiene polymer produced with one or more of these fluidization aids produces a resin particle comprising an outer shell having a mixture of a polymer and an inert particulate material, wherein the inert particulate material is present in the outer shell in an amount higher than 75% by weight based on the weight of the outer shell; and an inner core having a mixture of inert particulate material and polymer, wherein the polymer is present in the inner core in an amount higher than 90% by weight based on the weight of the inner core. These polymer particles are granular and free-flowing upon exiting the reactor and are produced by a fluidized bed polymerization process at or above the softening point of the sticky polymer.

The polymerizations can be carried out in a single reactor or multiple reactors, typically two or more in series, can also be employed. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed a reaction zone.

Generally, all of the above modes of polymerizing are carried out in a gas phase fluidized bed containing a "seed bed" of polymer which is the same or different from the polymer being produced. Preferably, the bed is made up of the same granular polymer that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, isopentane) and, if desired, modifiers (e.g., hydrogen). Thus, during the course of a polymerization, the bed comprises formed polymer particles, growing polymer particles, catalyst particles, and optional flow aids (fluidization aids) fluidized by polymerizing and modifying gaseous components introduced at a flow rate or velocity sufficient to cause the particles to separate and act as a fluid.

In general, the polymerization conditions in the gas phase reactor are such that the temperature can range from sub-atmospheric to super-atmospheric, but is typically from about 0 to 120° C., preferably about 40 to 100° C., and most preferably about 40 to 80° C. Partial pressure will vary depending upon the temperature of the polymerization, and it can range from about 1 to 300 psi (6.89 to 2,067 kiloPascals), preferably 1 to 100 psi (6.89 to 689 kiloPascals). The condensation temperature of butadiene is well known. In general, it is preferred to operate at temperatures slightly above to slightly below (that is, for example, ±10° C. for butadiene and/or isoprene) the dew point. Preferably, the gas phase process used in conjunction with the inventive method is conducted in a continuous gas phase reactor or a semibatch gas phase reactor in the presence of an inert particulate material under reaction conditions such that at least a portion of the butadiene is maintained at or below its dew point temperature.

All references cited herein are incorporated by reference.

Whereas the scope of the invention is set forth in the appended claims, the following examples illustrate certain aspects of the present invention. The examples are set forth for illustration and are not to be construed as limitations on the invention except as set forth in the claims.

EXAMPLES

Preparation of Catalysts Used in the Examples

The catalysts employed in the subsequent examples were prepared as follows:

Catalyst Preparation A—Catalyst based on neodymium versatate and diethyl aluminum chloride (DEAC)

Raw materials: Nd Versatate from Rhone-Poulenc. The specifications for this hexane solution were 9 wt % Nd, 200 ppm water, and 8.73 wt % free acid.

Neodymium impregnation (catalyst precursor): Add 50 mL of dry hexane purged with nitrogen to a 100 mL Schlenk airless oven-dried flask. Add 8.75 g Nd Versatate solution and stir 20–30 minutes at room temperature. Add 10.0 g $SiO_2$ (Davison 958 grade dried at 600° C.) and stir 30 minutes at room temperature. Dry under high vacuum.

DEAC treatment: Add 25 mL of dry hexane purged with nitrogen to a 50 mL Schlenk airless oven-dried flask. Add 5.25 mL DEAC (1.5 M) and stir for 10 minutes. Add 5 g of the catalyst precursor and stir for 30 minutes in water bath at room temperature. Dry under high vacuum.

Final Analysis: Nd=0.32 mmole/g catalyst, Cl/Nd=4.3.

Catalyst Preparation B—Catalyst Based on Neodymium Versatate and Diethyl Aluminum Chloride (DEAC)

Raw materials: Nd Versatate from Rhone-Poulenc. The specifications for this hexane solution were 9 wt % Nd, 151 ppm water, and 9.9 wt % free acid.

Neodymium impregnation (catalyst precursor): Add 50 mL of dry hexane purged with nitrogen to a 100 mL Schlenk airless oven-dried flask. Add 12.67 g Nd Versatate solution and stir 20–30 minutes at room temperature. Add 10.092 g $SiO_2$ (Davison grade 958 dried at 600° C.) and stir 30 minutes at room temperature. Dry under high vacuum.

DEAC treatment: Add 25 mL of dry hexane purged with nitrogen to a 50 mL Schlenk airless oven-dried flask. Add 8.0 mL DEAC (1.5 M) and stir for 10 minutes. Add 5 g of the catalyst precursor and stir for 30 minutes in water bath at room temperature. Dry under high vacuum.

Final Analysis: Nd=0.39 mmole/g catalyst, Cl/Nd=5.

Catalyst Preparation C—Preparation of Catalyst Based on Neodymium Versatate and Ethyl Aluminum Sesquichloride (EASC)

Raw materials: Nd Versatate from Rhone-Poulenc. The specifications for this hexane solution were 9 wt % Nd, 151 ppm water, and 9.9 wt % free acid.

EASC treatment (catalyst precursor): Add 200 mL of dry hexane purged with nitrogen to a 500 mL Schlenk airless oven-dried flask. Add 21.1 mL EASC (1.5 M) and stir for 10 minutes. Add 31.9 g of SiO2 (Davison 958 grade dried at 600° C.) and stir for 30 minutes in water bath at room temperature. Dry under high vacuum.

Neodymium impregnation: Add 150 mL of dry hexane purged with nitrogen to a 500 mL Schlenk airless oven-dried flask. Add 30.45 g Nd Versatate solution from Rhone-Poulenc and stir 20–30 minutes at room temperature. Add 28 g of the EASC on silica catalyst precursor prepared above and stir for 30 minutes at room temperature. Dry under high vacuum.

Final Analysis: Nd=0.44 mmole/g catalyst, Cl/Nd=2.

Examples 1–11 (Semi-batch Reactor) Reactor

The semi-batch reactor was a two-phase (gas/solid) stirred bed, back mixed reactor. A set of four plows were mounted horizontally on a central shaft rotated at 190 rpm to keep the particles in the reactor mechanically fluidized. The cylinder swept by these plows measured 40.6 cm (16 in.) long by 39.7 cm (15.6 in.) in diameter, resulting in a mechanically fluidizable volume of 45 liters (1.65 ft$^3$). The gas volume was larger than the mechanically fluidizable volume due to the vertical cylindrical chamber plus other ancillary equipment in the reaction system and totaled 62.6 liters (2.21 ft$^3$).

Process description and conditions. The reactor pressure used was 300 psig. Butadiene monomer was fed to the reactor continuously via control valves. Partial pressures of monomer ranged from 20–65 psi as set forth in the tables. Gas composition was measured by a gas chromatograph analyzer. Nitrogen made up the balance of the composition of the gas, entering with the catalyst and leaving via a small vent for the reactor gases. Vent opening was adjusted via computer to maintain constant total pressure in the reactor.

The reactor was cooled by an external jacket of glycol. The bed temperature was measured with an RTD temperature probe in a thermowell protruding into the bed between the inner set of plows. Reactor temperature was controlled to values in the range of 500 to 75° C. for polybutadiene production.

Supported catalyst (neodymium versatate deposited on DEAC-treated silica, NdV/DOS) made by Catalyst Preparation A was added continuously along with butadiene monomer in the semibatch operation. The supported catalyst was carried through a dry catalyst feeder by nitrogen. Alkyl cocatalysts were also added continuously, at fixed molar ratios to the catalyst feed rate. Batch yields of granular polymer in the reactor were 4 to 6 pounds and the runs lasted 2 to 6 hours. A fluidization aid (N-650 grade of carbon) was used at 30 to 40 wt % level to prevent agglomeration due to stickiness.

A run was commenced by charging the reactor with required amount of carbon black and passivating it with the alkyl (cocatalyst) used in the run. Next, the monomer was charged to the reactor and the feeds (nitrogen and butadiene) were adjusted until the desired gas composition was reached. After catalyst feed had started, butadiene was added to the reactor to maintain gas concentrations. As the catalyst inventory built up, polymer production rate increased to 3 to 10 pounds per hour, at which point catalyst feed was reduced to maintain a constant polymer production rate. Alkyl (cocatalyst) rate was maintained in proportion to the catalyst feed rate. After the desired batch weight was made, monomer was purged, the catalyst was deactivated with isopropanol, and the polymer was stabilized with a mixture of butylated hydroxytoluene (BHT) and zinc oxide. Residual monomer was then purged with nitrogen for several hours until only a few ppm of monomer were left in the polymer.

The batch was finally discharged into a bag. Peak average molecular weight (Mp) and weight average molecular weight (Mw) were measured by gel permeation chromatography (GPC).

Although this is a semibatch stirred gas phase reactor, it is operated in a manner that allows it to approximate the conditions, catalyst performance, and resulting product of a continuous fluid bed gas phase reactor, especially in the aspects most important to control of molecular weight and molecular weight distribution. For example, the semibatch reactor is a single reactor with continuous catalyst feed throughout the entire or nearly the entire polymerization. The reactor is backmixed and monomer that is consumed is replenished continuously so that monomer concentration is steady as in a fluid bed reactor. Other similarities are apparent. The reactor is semibatch in that fluidization aid is batch charged at the start and product is batch discharged at the end of the polymerization.

Effect of Temperature

Examples 1 and 2 illustrate how the polymer molecular weight and molecular weight distribution are controlled using reactor temperature. As seen in these examples, by increasing the reaction temperature from 60 degrees to 75 degrees C. a significant drop in polymer molecular weight (MW) and a significant broadening in polymer molecular weight distribution (MWD) were caused. In these examples the cocatalyst was DIBAH, the butadiene pressure was 63 psia, the average catalyst residence time was about 58 minutes, and the cocatalyst concentration was about 9200 ppm in the product. Catalyst made per preparation A was used.

| Ex. No. | Temp. (° C.) | Reduced Viscosity (dl/g) | Mp × 1000 | Mw × 1000 | Mw/Mn |
|---|---|---|---|---|---|
| 1 | 53 | 7.4 | 845 | 1174 | 9.7 |
| 2 | 66 | 5.7 | 480 | 1095 | 10.8 |

Effect of Monomer Partial Pressure

Examples 3 and 4 illustrate how the polymer MW is controlled separately from MWD by varying the monomer partial pressure. By decreasing the monomer partial pressure by half a significant drop in polymer MW was caused, but with little change in polymer MWD. For this catalyst recipe the relationship of Mw with butadiene partial pressure (p) can be expressed as:

$$Mw = 74680 + 12320\, p.$$

In these examples, the cocatalyst was DIBAH; the temperature was 60° C., the average catalyst residence time was about 2 hrs, and the cocatalyst concentration was 15,000 ppm in the product. Catalyst made per preparation A was used.

| Ex. No. | Butadiene Partial Pressure (psia) | Reduced Viscosity (dl/g) | Mp × 1000 | Mw × 1000 | Mw/Mn |
|---|---|---|---|---|---|
| 3 | 63 | 5.4 | 296 | 851 | 11.1 |
| 4 | 32 | 3.9 | 120 | 469 | 11.5 |

Effect of Alkyl Concentration and (Al/Nd) Ratio

Examples 5 and 6 illustrate how by varying the cocatalyst concentration (or its ratio to Nd) the MW and MWD of the polymer are controlled. Increasing the cocatalyst concentration or the ratio of cocatalyst metal/catalyst metal (rare earth) caused a significant drop in polymer MW and a slight increase in polymer MWD. In these examples the cocatalyst was DIBAH; the temperature was 60° C.; butadiene pressure was 63 psia; and the average catalyst residence time was about 40 minutes. Catalyst made per preparation A was used.

| Ex. No. | (Al/Nd) in continuous feed | (Al/Nd) in total product | Al Alkyl Residue in product (ppm) | Reduced Viscosity (dl/g) | Mp × 1000 | Mw × 1000 | Mw/Mn |
|---|---|---|---|---|---|---|---|
| 5 | 83 | 254 | 10520 | 5.4 | 455 | 1015 | 12.0 |
| 6 | 198 | 388 | 12640 | 3.7 | 188 | 725 | 12.5 |

Effect of Alkyl Selection

Examples 7 and 8 illustrate how by selectively choosing the cocatalyst the MW and MWD of the polymer are controlled. Lower MW and substantially broader MWD polymer was obtained when DIBAH was used in place of TIBA. In these examples butadiene pressure was 63 psia; the temperature was 60° C.; and the average catalyst residence time was 100 minutes. Catalyst made per preparation A was used.

| Ex. No. | Alkyl | Mp × 1000 | Mw × 1000 | Mw/Mn | Al Alkyl Residue in product (ppm) |
|---|---|---|---|---|---|
| 7 | DIBAH | 296 | 851 | 11.1 | 14,990 |
| 8 | TIBA | 567 | 989 | 6.7 | 17,630 |

Effect of Residence Time

Examples 9 and 10 illustrate how the molecular weight and MWD of the polymer are controlled by varying the average catalyst residence time. The average catalyst residence time was increased substantially to cause a substantial increase in polymer MW and a mild narrowing in polymer MWD. The polymer MW increase was shown by both an increase in the reduced viscosity and molecular weight as measured by gel permeation chromatography (GPC). In these examples the temperature was 60° C.; and the butadiene pressure was 63 psia. Catalyst made per preparation A was used.

| Ex. No. | Average Catalyst Residence Time (min) | Reduced Viscosity (dl/g) | Mp × 1000 | Mw × 1000 | Mw/Mn | Al Alkyl Residue in product (ppm) |
|---|---|---|---|---|---|---|
| 9 | 38 | 3.7 | 188 | 725 | 12.5 | 12,640 |
| 10 | 159 | 5.3 | 647 | 1100 | 11 | 14,460 |

Examples 11–17 (Fluid Bed Reactor)

These continuous fluid bed examples showed similar results as those found in the polymerization reactions run in semi-batch operation with respect to controlling polymer MW and MWD with neodymium based catalysts. The fluid bed used here was the same type as that described above.

Effect of Monomer Partial Pressure

The polymer MW was separately controlled by varying the monomer partial pressure. Examples 11 and 12 show how a significant drop in polymer MW as measured by GPC was caused by decreasing the monomer partial pressure by half.

| Ex. No. | 11 | 12 |
|---|---|---|
| Catalyst Preparation: Composition, Character | B | B |
| Cis-1,4 (IR) | >97% | >97% |
| CB PHR | 38.2 | 46.1 |
| Nd ppm in Product | 17.3 | |
| GPC | | |
| Mn | 1.28E + 05 | 1.01E + 05 |
| Mw | 9.59E + 05 | 7.43E + 05 |
| Mw/Mn | 7.5 | 7.4 |
| REACTION CONDITIONS (time weighted averages) | | |
| Temperature, ° C. | 60.0 | 60.0 |
| Pressure, psig | 349 | 349 |
| BD Partial Pressure, psia | 62.5 | 30.2 |
| BD Feed Rate lb/hr | 32.8 | 20.9 |
| Fluidization Aid Type | N650 | N650 |
| COCATALYST | | |
| Type and conc. Wt % | DIBAH 20% | DIBAH 20% |
| Feed Rate, cc/hr | 999 | 650 |
| Alkyl ppmw in product | 10423 | 9328 |
| Al/Nd Molar Ratio | 610 | |
| PHYSICAL CONDITIONS | | |
| Superficial Velocity, ft/sec | 1.62 | 1.59 |
| Production Rate, lb/hr | 27.5 | 19.8 |
| Bed Weight, lb | 109.4 | 91.2 |
| Bed Volume, ft3 | 6.0 | 6.9 |
| Fluid. Bulk Density, lb/ft3 | 18.2 | 13.2 |
| STY, lb/hr/ft3 | 4.58 | 2.87 |
| Residence Time, hr | 4.0 | 4.6 |

Effect of Residence Time

Examples 13 and 14 show how the molecular weight of the polymer was controlled by varying the average catalyst residence time. As the catalyst residence time was increased the polymer MW increased. This was shown by an increase in molecular weight as measured by gel permeation chromatography (GPC).

| Ex. No. | 13 | 14 |
|---|---|---|
| Catalyst Preparation: Composition & Character | C | C |
| Cis-1,4 (IR) | >97% | >97% |
| CB PHR | 49.9 | 59.0 |
| Nd ppm in Product | | |
| GPC | | |
| Mn | 4.95E + 05 | 3.90E + 05 |
| Mw | 1.76E + 06 | 1.38E + 06 |
| Mw/Mn | 3.9 | 3.5 |
| REACTION CONDITIONS (time weighted averages) | | |
| Temperature, ° C. | 60.0 | 60.0 |
| Pressure, psig | 304 | 334 |
| BD Partial Pressure, psia | 25.8 | 26.6 |
| BD Feed Rate lb/hr | 34.2 | 34.5 |
| Fluidization Aid Type | N650 | N650 |
| COCATALYST | | |
| Type and conc. Wt % | TIBA 20% | TIBA 20% |
| Feed Rate, cc/hr | 1342 | 1661 |

-continued

| Ex. No. | 13 | 14 |
|---|---|---|
| Alkyl ppmw in product | 13405 | 13857 |
| Al/Nd Molar Ratio | | |
| PHYSICAL CONDITIONS | | |
| Superficial Velocity, ft/sec | 1.50 | 1.50 |
| Production Rate, lb/hr | 30.3 | 34.2 |
| Bed Weight, lb | 103.6 | 83.7 |
| Bed Volume, ft3 | 5.30 | 6.30 |
| Fluid. Bulk Density, lb/ft3 | 19.7 | 13.3 |
| STY, lb/hr/ft3 | 5.7 | 5.4 |
| Residence Time, hr | 3.4 | 2.5 |

Effect of Alkyl Concentration and (Al/Nd) Ratio

Examples 15, 16 and 17 illustrate how by varying the cocatalyst concentration (or ratio to Nd), the MW and MWD of the polymer were controlled. Increasing the cocatalyst concentration or the ratio of cocatalyst metal/catalyst metal caused a significant drop in polymer MW and a significant broadening of the MWD.

| Ex. No. | 15 | 16 | 17 |
|---|---|---|---|
| Catalyst Preparation: Composition & Character | C | C | C |
| Cis-1,4 (IR) | >97% | >97% | >97% |
| CB PHR | 51.1 | 35.8 | 59.7 |
| ND ppm in Product | 128 | 130 | 113 |
| GPC | | | |
| Mn | 5.67E + 05 | 4.75E + 05 | 2.55E + 05 |
| Mw | 2.06E + 06 | 1.84E + 06 | 1.29E + 06 |
| Mw/Mn | 3.6 | 3.9 | 5.1 |
| REACTION CONDITIONS (time weighted averages) | | | |
| Temperature, ° C. | 60.0 | 60.0 | 60.0 |
| Pressure, psig | 353 | 351 | 371 |
| BD Partial Pressure, psia | 30.0 | 30.0 | 30.0 |
| BD Feed Rate lb/hr | 33.2 | 36.4 | 33.6 |
| Fluid Aid Type | N339 | N339 | N339 |
| COCATALYST | | | |
| Type and conc. Wt % | TIBA 20% | TIBA 20% | TIBA 20% |
| Feed Rate, cc/hr | 18922 | 2270 | 2216 |
| Alkyl ppmw in product | 17284 | 21618 | 24971 |
| Al/Nd Molar Ratio | 98.2 | 166 | 161 |
| PHYSICAL CONDITIONS | | | |
| Superficial Velocity, ft/sec | 1.30 | 1.3 | 1.3 |
| Production Rate, lb/hr | 31.0 | 29.7 | 23.7 |
| Bed Weight, lb | 59.0 | 50.6 | 49.3 |
| Bed Volume, ft3 | 5.0 | 4.7 | 4.5 |
| Fluid. Bulk Density, lb/ft3 | 11.8 | 10.7 | 10.9 |
| STY, lb/hr/ft3 | 6.2 | 6.3 | 5.3 |
| Residence Time, hr | 1.9 | 1.7 | 2.1 |

Examples 18–19

Examples 18 and 19 show how the invented method for controlling polymer MW and MWD of polybutadiene made from a rare earth metal catalyst is practiced in two specific instances involving catalysts made with different recipes. The specific catalyst and its preparation recipe have a strong effect on the properties of the polymer made. As the technique is applied, a number of factors besides polymer MW and MWD can also be considered, for example effects on catalyst productivity, economics and monomer condensation levels in the reactor. Judicious selections must be made from among the several variables that are used to control polymer MW and MWD.

The first step is generally to choose a suitable cocatalyst. For a catalyst recipe that inherently makes polymer with high MW or if a broad MWD is desired, the preferred cocatalyst is DIBAH. For a catalyst recipe that inherently makes polymer with low MW or if a narrow MWD is desired, the preferred cocatalyst is TIBA. For a catalyst recipe that inherently makes polymer with moderate MW or if an intermediate MWD is desired, the preferred cocatalyst is TIBA or mixtures of TIBA and DIBAH. Having chosen a cocatalyst, the other control factors are manipulated in the manner exemplified in Examples 18 and 19 to achieve the desired polymer properties.

Example 18

For a neodymium catalyst made according to catalyst preparation method A with 4.3 Cl/Nd ratio, DIBAH is selected as cocatalyst. This combination generally gives polymer with low MW and broad MWD under convenient conditions, such as 60° C., greater than 30 psia butadiene partial pressure, an average catalyst residence time of about 1–2 hours, and a cocatalyst concentration of about 10,000 ppm. If it is desired to adjust MW higher and MWD narrower using the invented method, reactor temperature can be lowered towards 50° C. since that moves both polymer MW and MWD in the desired directions and also beneficially raises catalyst productivity. If further adjustment is needed in the same directions, catalyst residence time can be raised since that moves both polymer MW and MWD in the desired directions and also beneficially raises catalyst productivity. The residence time adjustment would typically be done after the temperature adjustment because the temperature effect is stronger, but either sequence will suffice. If further adjustment is needed in the same directions, cocatalyst concentration can be lowered towards 5000 ppm since that moves both polymer MW and MVVD in the desired directions and has little effect on catalyst productivity at these levels. When the polymer MWD is at the desired target, if the polymer MW is still low, butadiene partial pressure can be increased because that raises the polymer MW significantly with little effect on polymer MWD above about 30 psia.

Example 19

For a neodymium catalyst made according to catalyst preparation method C with 2.0 Cl/Nd ratio, either TIBA or a mixture of TIBA and DIBAH is selected as cocatalyst. If TIBA is selected, this combination generally gives polymer with high MW and narrow MWD under convenient conditions, such as 60° C., greater than 30 psia butadiene partial pressure, an average catalyst residence time of about 1–2 hours, and a cocatalyst concentration of about 10,000 ppm. If it is desired to adjust MW lower and MWD broader using the invented method, butadiene partial pressure can be lowered towards 30 psia since that moves both polymer MW and MWD in the desired directions with little effect on catalyst productivity in this range. If further adjustment is needed in the same directions, butadiene partial pressure can be lowered further, cocatalyst concentration can be raised and catalyst residence time can be lowered since these changes move both polymer MW and MWD in the desired directions. These changes would typically be done after the initial butadiene partial pressure adjustment because these changes will result in some loss in catalyst productivity. If further adjustment is needed in the same directions, reactor temperature can be raised towards 75° C. since that moves both polymer MW and MWD in the desired directions. If these manipulations do not result in polymer with the desired MW and MWD, the control process should be repeated using a suitably chosen mixture of TIBA and DIBAH.

What is claimed is:

1. A method of controlling the molecular weight, molecular weight distribution or both of high cis-1,4-polybutadiene that is produced in a reactor in a gas phase process from 1,3-butadiene in the presence of a rare earth metal containing catalyst and at least one aluminum containing cocatalyst, which method comprises adjusting at least one of:
   (a) the temperature of the polymerization;
   (b) the butadiene partial pressure;
   (c) the concentration of cocatalyst in the product in the reactor or alternatively, the ratio of the aluminum metal of the cocatalyst to the rare earth metal of the catalyst;
   (d) selection of cocatalyst; and
   (e) the residence time of the rare earth catalyst in the polymerization zone of a reactor.

2. The method of claim 1 wherein the molecular weight is controlled by adjusting the temperature of the polymerization and the molecular weight distribution is controlled by manipulating at least one of: (i) the butadiene partial pressure, (ii) the residence time of the rare earth catalyst, (iii) the ratio of the aluminum metal of the cocatalyst to the rare earth metal of the catalyst, and (iv) selection of cocatalyst.

3. The method of claim 2 wherein the molecular weight distribution is controlled by selection of cocatalyst, the residence time of the rare earth metal catalyst in the reactor, or both.

4. The method of claim 1 wherein the molecular weight is controlled by adjusting the partial pressure of butadiene and molecular weight distribution is controlled by manipulating at least one of (i) selection of cocatalyst, (ii) reaction temperature, and (iii) residence time of the rare earth metal in the reactor.

5. The method of claim 1 wherein the molecular weight is controlled by adjusting the cocatalyst concentration and molecular weight distribution is controlled by manipulating at least one of (i) selection of cocatalyst, (ii) reaction temperature, (iii) residence time of the rare earth metal in the reactor, and (iv) cocatalyst concentration.

6. The method of claim 1 wherein the molecular weight and molecular weight distribution are controlled by the selection of cocatalyst.

7. The method of claim 6 wherein the molecular weight and molecular weight distribution are controlled by the use of two or more cocatalysts.

8. The method of claim 7 wherein the molecular weight and molecular weight distribution are controlled by varying the proportions of said two or more cocatalyst.

9. The method of claim 8 wherein the two or more cocatalysts are di-isobutylaluminum hydride and tri-isobutylaluminum.

10. The method of claim 1 wherein the molecular weight and molecular weight distribution are controlled by adjusting the catalyst residence time by at least one of (i) regulating the catalyst feeds, (ii) regulating the rate of removal of product, (iii) adjusting the bed weight of materials present in the polymerization zone of the reactor, (iv) adjusting catalyst productivity, and (v) adjusting fluidized bulk density.

11. The method of claim 1 wherein the gas phase process is conducted in a continuous gas phase reactor or a semibatch gas phase reactor in the presence of an inert particulate material under reaction conditions such that at least a portion of the butadiene is maintained at or below its dew point temperature.

12. The method of claim 11 wherein the gas phase process is conducted at a temperature ranging from about 40 degrees C. to about 100 degrees C., a monomer partial pressure ranging from about 1 to 100 psi, and the inert particulate material is selected from the group consisting of carbon black, silica, clay, talc, and mixtures thereof.

* * * * *